(12) United States Patent
Paradowski

(10) Patent No.: US 6,368,385 B1
(45) Date of Patent: Apr. 9, 2002

(54) PROCESS AND APPARATUS FOR THE PURIFICATION OF NATURAL GAS AND PRODUCTS

(75) Inventor: Henri Paradowski, Cergy-Pontoise (FR)

(73) Assignee: TECHNIP, Courbevoie (FR)

( * ) Notice: Subject to any disclaimer, the term of this patent is extended or adjusted under 35 U.S.C. 154(b) by 0 days.

(21) Appl. No.: 09/626,447

(22) Filed: Jul. 26, 2000

(30) Foreign Application Priority Data

Jul. 28, 1999 (FR) .......................................... 99 09807

(51) Int. Cl.[7] .............................................. B01D 53/14
(52) U.S. Cl. ............................. 95/181; 95/184; 95/235; 95/237
(58) Field of Search .......................... 95/178, 179, 180, 95/181, 184, 193, 194, 209, 235, 237

(56) References Cited

U.S. PATENT DOCUMENTS

| | | | | |
|---|---|---|---|---|
| 2,117,548 A | * | 5/1938 | Drennan | |
| 2,168,683 A | * | 8/1939 | Raigaorodsky | |
| 2,241,716 A | * | 5/1941 | Roberts, Jr. et al. | |
| 2,419,039 A | * | 4/1947 | Scarth | |
| 2,423,156 A | * | 7/1947 | Reid | |
| 2,973,834 A | * | 3/1961 | Cicalese | |
| 3,899,312 A | * | 8/1975 | Kruis et al. | |
| 3,966,875 A | * | 6/1976 | Bratzler et al. | |
| 4,020,144 A | * | 4/1977 | Bosniack | |
| 4,088,735 A | * | 5/1978 | Bratzier et al. | |
| 4,097,250 A | * | 6/1978 | Pagani et al. | |
| 4,186,061 A | * | 1/1980 | Zellers et al. | |
| 4,305,733 A | * | 12/1981 | Scholz et al. | |
| 4,332,596 A | * | 6/1982 | Ranke et al. | |
| 4,370,156 A | * | 1/1983 | Goddia, Jr. et al. | |
| 4,421,535 A | | 12/1983 | Mehra | |
| 4,696,688 A | * | 9/1987 | Mehra | |
| 4,957,715 A | * | 9/1990 | Grover et al. | |
| 5,413,627 A | * | 5/1995 | Landeck et al. | |
| 5,659,109 A | | 8/1997 | Fernandez et al. | |

FOREIGN PATENT DOCUMENTS

EP 0 395 490 6/1992

* cited by examiner

*Primary Examiner*—Duane S. Smith
(74) *Attorney, Agent, or Firm*—Leydig, Voit, & Mayer, Ltd.

(57) ABSTRACT

A process and apparatus for the purification of a gas, in particular natural gas, in order to eliminate mercaptans without the use of gas adsorption or cryogenic expansion processes. Natural gas, dried and cooled, is supplied to an absorption column under pressure, producing a head product of a purified gas, and a base product supplied to a fractionating column which separates the most volatile compounds, free from mercaptans, from a gasoline fraction of the natural gas. The mercaptans are eliminated at the head of at least one distillation column, producing a base end product consisting of a mixture of C5 hydrocarbons, heavier than and free from volatile mercaptans, partially mixed with the most volatile recompressed compounds of the natural gas. This mixture is cooled and sent by reflux to the absorption column.

14 Claims, 2 Drawing Sheets

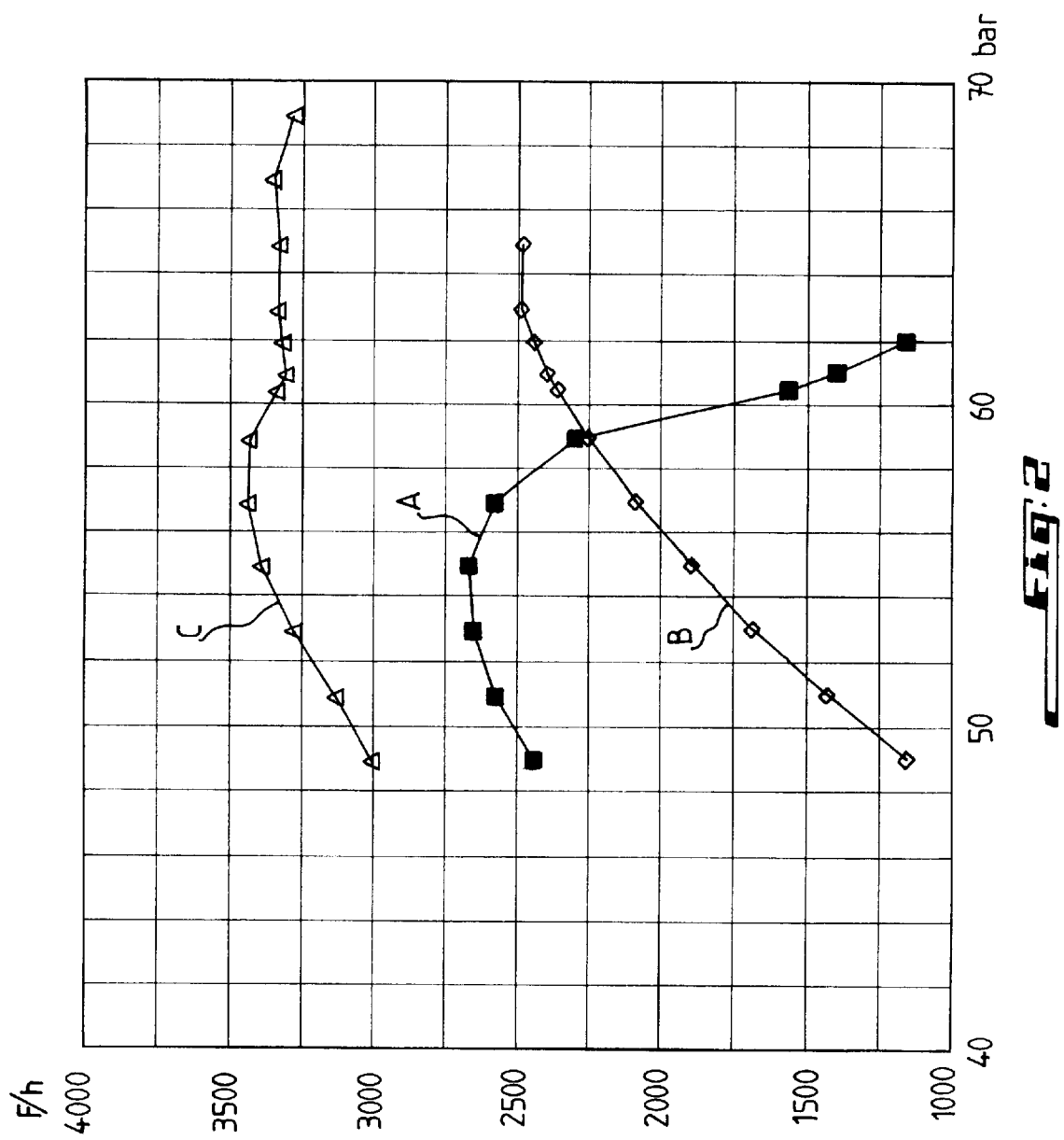

PROCESS AND APPARATUS FOR THE PURIFICATION OF NATURAL GAS AND PRODUCTS

BACKGROUND OF THE INVENTION

The present invention generally concerns, and essentially has as its purpose, a process for purification of a gas, in particular a natural gas containing C1 to C5 hydrocarbons and heavier, in order to eliminate sulphur compounds of the volatile mercaptan type without gas adsorption or cryogenic expansion processes, for example in a turbo-expander. It also concerns the products obtained by implementation of this process and an installation for application of the process.

It is known that a gaseous fluid, effluent of a natural gas reservoir, generally contains substances of nauseous odour formed mainly from mercaptans such as, for example:

methyl mercaptan or methanethiol, chemical formula $CH_4S$, which is highly volatile and boils at 5.9° C., ethyl mercaptan or ethanethiol, chemical formula $C_2H_6S$ which is less volatile and boils at 35° C., propanethiols including, in particular, isopropyl mercaptan and n-propyl mercaptan, and increasingly heavy mercaptans which are therefore less and less volatile.

The presence of mercaptans in natural gas extracted from a reservoir presents the following disadvantages for a natural gas: firstly a nauseous odour, secondly high toxicity, and finally, the presence of impurities likely to be decomposed into hydrogen sulphide and disulphide and therefore corrosive, especially for the pipes transporting such a fluid.

A known technical problem is how to obtain, from the effluent of a natural gas reservoir, on the one hand natural gas in which the level of mercaptans has been reduced to 10 parts per million so that it can be used in accordance with commercial specifications for its transportation by gas pipeline to the customer or distributor and, on the other hand, recovery products made up, in particular, of stabilized gasoline consisting of C5 hydrocarbons and heavier.

As the prior technique stands, this known technical problem can be resolved in particular by one of the following three processes:

1) The molecular sieve adsorption process at an effective pressure of about 60 bar.

This process presents the disadvantage of producing a gas which results in the regeneration of the adsorbent and which is rich in mercaptans (i.e. containing about 20 times the level of mercaptans of the gas to be processed) whose discharge is prohibited by local environmental protection regulations and which represents either gas losses or subsequent processing costs which are prohibitively high.

2) The high pressure absorption process (for example 60 bar) in a heavy hydrocarbon, for example C7 or heavier.

This process presents the disadvantage of producing intermediate products, for example propane-based, which cannot always be made use of and which must therefore be reinjected into the purified gas with circulation of huge quantities of C7 hydrocarbon solvents and heavier, resulting in an increase in the cost of the absorber and the use of large quantities of heat in the reboilers and refrigeration in the coolers 3) The cryogenic processing procedure in which one common mode of operation presents the disadvantage of expanding the source gas which then has to be recompressed in order to deliver it to the distribution gas pipeline. This process also results in the production of intermediate products, for example propane-based which cannot always be made use of and which must therefore be reinjected into the purified gas, resulting in the need to use several compressors which are costly in terms of equipment and energy, as well as the need for intensive drying of the source gas to reduce its moisture content to less than 0.1 part per million.

Such a process of cryogenic processing is described for example in :

U.S. Pat. No. 3,763,658, published on Oct. 9, 1973, which presents the disadvantage of high running costs, particularly in terms of high operating pressure;

U.S. Pat. No. 5,655,109, published on Aug. 19, 1997, whose running costs are markedly lower in terms of high operating pressures than those of the previous patent, and which therefore represents an appreciable improvement over the previous patent.

SUMMARY OF THE INVENTION

The main purpose of the present invention is to eliminate the disadvantages of the aforementioned known processes whilst retaining their advantages by creating a process which avoids the production of propane, for example, when this product is not desired, which avoids the expansion of the source gas and which avoids the use of large quantities of absorption oil, particularly C7 hydrocarbon-based or heavier. The invention therefore represents a novel solution to a technical problem because of its specific definition as described above. The invention thus offers the important advantage of much lower running costs than those of the aforementioned known processes and therefore represents a perfecting or appreciable improvement in relation to the known processes.

To this end, the process according to the invention consists in successively passing the previously dried and partially cooled source gas through an absorption column under pressure which receives a reflux fluid and whose head product is a purified gas, with a mercaptan content of less than 30 parts per million, and whose base product supplies a fractionating column which separates the most volatile compounds of the source gas at the top, free from mercaptans, from the gasoline fraction of said source gas withdrawn from the bottom and containing mercaptans, the most volatile of which are eliminated at the top of at least one distillation column whose base product, consisting of liquid gasoline with a mixture of C5 hydrocarbons and heavier, processed by sweetening such that it no longer contains volatile mercaptans, is partially mixed with the most volatile compounds separated at the top of the natural gas fractionating column and then recompressed, this mixture being cooled down and sent by reflux to the absorption column to constitute said reflux fluid in it.

In the sense of the present description, the most volatile compounds of the source gas will be considered free from mercaptans once their mercaptan level is less than 30 parts per million.

In addition, the liquid gasoline processed by sweetening will be considered to be no longer containing any volatile mercaptans once its volatile mercaptan level is less than 5 ppm, and preferably less than 1 ppm.

According to another characteristic of the invention, the main stream of source gas is subdivided beforehand into two partial bypass streams, one of which, previously cooled, supplies the lower section of the aforementioned absorption column, and the other, previously cooled, supplies an intermediate zone of said column.

According to another characteristic of the invention, the base product of the aforementioned absorption column, containing C2 hydrocarbons and heavier and mercaptans, is previously expanded before supplying a fractionating column enabling the separation of the most volatile compounds of the source gas from the mercaptans.

According to yet another characteristic of the invention, the base product of the aforementioned fractionating column, containing C3 hydrocarbons and heavier and mercaptans, supplies, after expansion, a first gasoline distillation column, preferably functioning as a depropanizer, and whose base product contains C4 hydrocarbons and heavier, and mercaptans.

In accordance with yet another characteristic of the invention, the head product of the aforementioned fractionating column, free from mercaptans and containing C1, C2 and C3 hydrocarbons, is cooled by partial condensation then separated, on the one hand, into a liquid phase which is sent to said column and, on the other hand, a gaseous phase which is recompressed before being mixed, as mentioned above, with at least a part of the distillation end product of the aforementioned gasoline fraction whose other part is extracted.

The head product of the fractionating column will be considered to be free from mercaptans once its mercaptan level is less than 30 ppm.

According to yet another characteristic of the invention, the base product of the aforementioned distillation column, containing C4 hydrocarbons and heavier, and mercaptans, supplies, after expansion, a second gasoline distillation column, preferably functioning a debutanizer, whose base product contains the residual gasoline fraction consisting of C5 hydrocarbons and heavier, and non-volatile mercaptans.

According to yet another characteristic of the invention, the head product of said first distillation column, containing C3 hydrocarbons and methylmercaptan, is cooled by undergoing complete condensation and then separated into two partial liquid streams, one of which is sent to the head of said column and the other of which undergoes a sweetening process to eliminate methylmercaptan, especially methylmercaptan in mixture with a sweetening agent, and to obtain a mixture of C3 hydrocarbons free from mercaptans, that is to say having a mercaptan level less than 5 ppm, and preferably less than 1 ppm.

According to another characteristic of the invention, the head product of the second distillation column, containing C4 hydrocarbons and residual volatile mercaptans, is cooled by complete condensation and then separated into two partial liquid streams, one of which is sent to the head of said column and the other of which undergoes a sweetening proecss to eliminate residual volatile mercaptans, especially those in mixture with a sweetening agent, and to obtain a mixture of C4 hydrocarbons free from mercaptans, that is to say having a mercaptan level less than 5 ppm, and preferably less than 1 ppm.

According to another characteristic of the invention, the partial stream of source gas to be cooled and the aforementioned reflux gas are cooled by the gas emitted at the head of said absorption column and, possibly, by an auxiliary cooling fluid, such as propane for example, the gas emitted from the column being, in this way, reheated by thermal exchange until it is close to room temperature.

The invention also concerns other products obtained by implementation of the aforementioned process, such products consisting, in particular, of processed gas free from mercaptans and, more precisely, containing less than 30 ppm of mercaptans, possibly consisting of a mixture of C3 hydrocarbons and C4 hydrocarbons and a gasoline comprised of a mixture of C5 hydrocarbons and heavier.

Finally, the invention concerns an installation for application of the aforementioned process and comprised of an absorption column under pressure to which are successively connected, from bottom to top, supply pipes for the source and reflux gas, the main supply pipe for the source gas branching into two bypass lines, one of which, along with the reflux pipe, passes through an heat exchanger in the same direction, and whose column head is connected to an outlet pipe for the processed gas passing through said heat exchanger, preferably in the opposite direction, while its base is connected by means of a pipe to a fractionating column, the base of which is connected by means of a pipe to at least one gasoline distillation column whose base is connected by means of an outlet pipe to the delivery pipe of a compressor having a suction section connected, by means of another pipe, to the head of the fractionating column, the outlet pipe and the delivery pipe joining at said reflux pipe.

According to another characteristic of the invention, the head of the fractionating column is connected by means of a pipe passing through a cooler-condenser to the inlet of a phase separator having a gas phase outlet connected by means of a pipe to the suction section of the aforementioned compressor whilst its liquid phase outlet is linked by means of a pipe to the upper section of said column.

According to yet another characteristic of the invention, the gasoline distillation system is comprised of two columns in series whose respective heads are each connected, by means of their respective pipes passing through a cooler-condenser, to the inlet of a condensate reservoir whose outlet opens into, on the one hand, a return pipe at the upper section of the associated column and, on the other hand, a header pipe towards a processing or utilization apparatus.

In accordance with another characteristic of the invention, the aforementioned header pipe, linked to the first distillation column, opens into the inlet to a sweetening apparatus whose outlet is connected to a C3 hydrocarbon reservoir whilst the aforementioned header pipe, linked to the second distillation column, opens into a C4 hydrocarbon sweetening or utilization system.

According to yet another characteristic of the invention, a bypass line for C5 hydrocarbons and heavier is connected to the outlet pipe at the base of the second distillation column.

In this way, the results obtained by the invention lead to significant advantages in terms of simplifying and increasing the savings made in the construction and technology required for the equipment used and the methods for their implementation.

The invention will be better understood and other characteristics, details and advantages of the invention will become clearer in the course of the description which follows below, with reference to the diagrammatic drawings in the appendices. These drawings are given purely for the purpose of example and are in no way restrictive.

BRIEF DESCRIPTION OF THE DRAWINGS

FIG. 2 illustrates, by means of a comparative diagram, the gain in running costs obtained by cryogenic processes for the elimination of mercaptans from a natural gas source according to the process of the invention and according to the two other previously known processes mentioned earlier.

DESCRIPTION OF THE PREFERRED EMBODIMENTS

Figure 1:
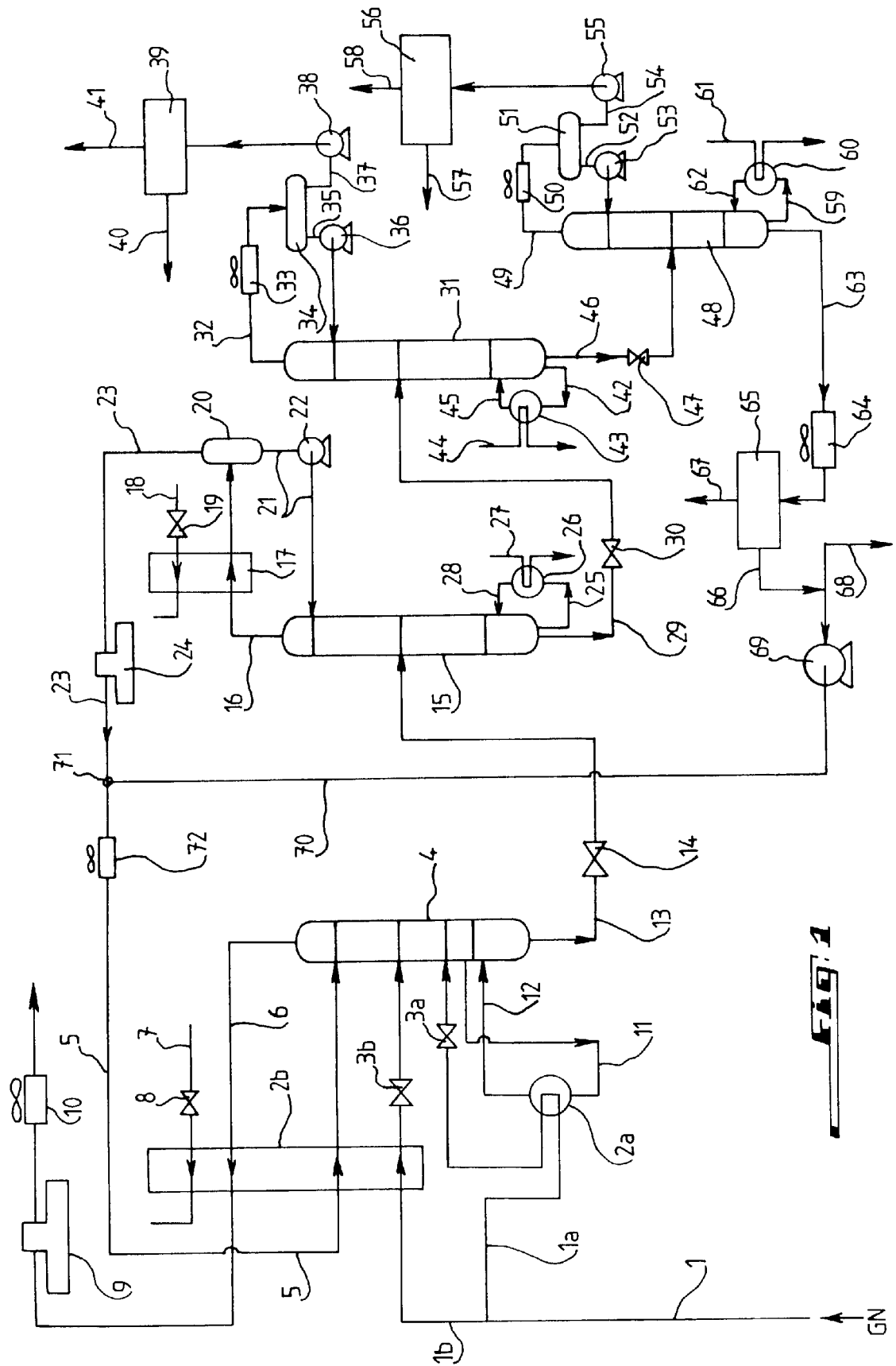
FIG. 1 represents a synoptic functional diagram of an installation in accordance with a specific and currently preferred mode of implementation of the invention.

The installation represented in diagram 1 is intended for processing, and in particular purifying, a source gas NG originating from a natural gas reservoir.

This source gas, preprocessed and previously dried to a residual humidity of, for example, about 5 parts per million, arrives at the installation by means of a principal pipe 1, for example at a temperature of 25° C. and an effective pressure of 65 bar.

This main stream of source gas is subdivided into two partial streams flowing through two bypass lines 1a and 1b and passing through two heat exchangers 2a and 2b and two distribution valves 3a and 3b before feeding into an absorption column 4.

The partial source gas stream flowing through bypass line 1a is previously cooled, for example to −7° C., by exchange of heat, with part of the base product in absorption column 4, in the exchanger 2a opend into the lower section of absorption column 4 by means of a distribution valve 3a whilst the other partial source gas stream, flowing in bypass 1b, is previously cooled, for example to −35° C., by passing through the heat exchanger 2b and a distribution valve 3b to arrive at the middle section of absorption column 4.

The absorption column has a temperature of about −30° C. and an effective pressure of about 60 bar. It should be noted that the fluid, carried by bypass line 1b, is partially condensed during the cooling process in the heat exchanger 2b.

A reflux pipe 5 also opens into the upper section of the absorption column 4 after passing through the heat exchanger 2b in which the reflux fluid, arriving under effective pressure of about 60 bar, is also cooled to −35° C.

The purified natural gas, that is to say gas from which mercaptans have been removed, accumulates at the top of the absorption column 4 and is discharged from it through an outlet pipe 6 passing through the heat exchanger 2b in a direction opposite to the direction of fluids circulating in pipes 1b and 5 respectively. In the heat exchanger 2b the purified natural gas from outlet pipe 6 acts as a cooling fluid, advantageously together with an auxiliary cooling fluid, such as, for example, a C3 hydrocarbon forming liquefied propane, circulating in an inlet pipe 7 and passing through, after expansion in a relief valve 8, the heat exchanger 2b in the same direction of flow as the processed gas flowing through pipe 6. As a result of this exchange of heat between cooling fluids and the source gas in pipe 1b, and the reflux fluid in pipe 5, the purified natural gas in pipe 6 is reheated to a temperature of about 20° C. and is then conveyed to, for example, a recompression 9 and cooling 10 station, the cooling fluid being, for example, atmospheric air.

The purified natural gas is brought back to pressure and temperature conditions similar to initial source gas conditions and, therefore, conditions compatible with distribution in a gas pipeline.

Part of the base product in the absorption column 4 supplies the heat exchanger 2a, through a pipe 11, with heat from the bypass stream 1a of the source gas. This exchanger 2a, forming the reboiler, produces a liquid and gas mixture which is conveyed back to the absorption column 4 by means of a pipe 12.

The liquid end product at the bottom of the absorption column 4, containing C1, C2 hydrocarbons and heavier, and mercaptans of general chemical formula RSH, is discharged from the column 4 through a pipe containing a valve 14 in which the aforementioned base product is expanded, for example, to an effective pressure of about 20 bar and supplies, through the pipe 13, a fractionating column 15 at an intermediate point in the column. The gaseous head, free from mercaptans and containing C1, C2 and C3 hydrocarbons, leaves the fractionating column 15 by means of a pipe 16 which passes through a cooler 17 whose cooling fluid is, for example, liquefied propane circulating in an inlet pipe 18 and passing through, after expansion in a valve 19, the heat exchanger 17 where the head product is partially condensed to form a two-phase stream arriving through pipe 16 into a phase separator 20 in which the liquid phase, accumulating at the base of the separator, leaves through a pipe 21 containing a condensate pump 22 to return to the upper section of the fractionating column 15.

The gaseous phase in the phase separator 20 leaves the upper section of the separator through a pipe 23 containing a compressor 24 in which this gaseous phase is compressed to a pressure of about 60 bar to compose one part of the aforementioned reflux fluid flowing in the pipe 5 where the relief pipe 23 of the compressor 24 ends.

The fractionating column 15 acts as a deethanizer and its base liquid contains C3 hydrocarbons (propane) and heavier, and mercaptans of the general chemical formula RSH. Part of this base liquid product leaves the base of the fractionating column 15 through a pipe 25 to supply a reboiler which acts as an heat exchanger heated by a fluid 27, such as water vapour and used to re-heat and partially evaporate the base liquid passing through the reboiler 26 from which the mixed phase, consisting of a mixture of liquid and vapour, returns via a pipe 28 to the lower end of the fractionating column 15.

The other part of the base liquid product in the fractionating column 15 leaves the column through a pipe 29 containing a relief valve 30 and opening into an intermediate zone of a first distillation column 31, which acts as a depropanizer, and whose gaseous head product contains propane and methylmercaptan. This gaseous head product leaves the first distillation column 31 through a pipe 32 and passes through a cooler 33 whose cooling fluid is, for example, atmospheric air and where the gaseous head product is completely condensed, the liquid condensate arriving by pipe 32 at the inlet of a liquid reservoir. One part of the liquid product leaves this reservoir 34 through a pipe 35 containing a condensate pump 36 to supply the upper section of the first distillation column 31, whilst the other part is carried by a pipe 37, containing a condensate pump 38, to the inlet of a sweetening unit 39 in which methylmercaptan $CH_3SH$ is separated, for example by washing with soda, from C3 hydrocarbons (propane) and leaves, mixed with the sweetening agent, through a pipe 40 whilst the hydrocarbons leave the sweetening unit 39 through a pipe 41.

The base liquid product of the first distillation column 31 contains C4 hydrocarbons and heavier, and residual mercaptans, except for methylmercaptan. Part of this base liquid product leaves the base of the first distillation column 31 through a pipe 42 which supplies a reboiler 43 where this base product is re-heated by a fluid 44, such as water vapour, and is partially evaporated to then return through a pipe 45 to the lower section of the first distillation column 31.

The other part of the base liquid product in the first distillation column 31 leaves the column through a pipe 46 to pass through a relief valve 47 and ends at the inlet of a second gasoline distillation column 48 at an intermediate zone in this column. In the second distillation column 48, the base product of the first distillation column 31 is fractionated into, on the one hand, a gaseous head product consisting of C4 hydrocarbons (butane) and residual volatile mercaptans, and on the other hand a base liquid product containing C5 hydrocarbons and heavier, as well as non-volatile mercaptans.

The gaseous head product of the second distillation column 48 leaves the column through a pipe 49 containing a cooler 50 whose cooling fluid is, for example, atmospheric air and where the gaseous head product undergoes complete condensation to arrive at the inlet of a liquid condensate reservoir 51 from which part of the liquid condensate leaves through a pipe 52 by being drawn in by a condensate pump 53 for reflux supply of the upper section of the second distillation column, whilst the other part of the liquid condensate is carried by a pipe 54, from a condensate pump 55, to the inlet of a sweetening unit 56, similar to the aforementioned unit 39, to produce C4 hydrocarbons (butane) free from mercaptans, and is discharged through a pipe 57, with the residual volatile mercaptans mixed with the sweetening agent being discharged through a pipe 58.

The base liquid product of the second distillation column 48, containing the aforementioned gasoline consisting of a mixture of C5 hydrocarbons and heavier and non-volatile mercaptans, partially leaves the base of the column through a pipe 59 supplying a reboiler 60, re-heated by a fluid 61 such as water vapour, leading to partial evaporation and from which the mixture of liquid and gas phases leaves through a pipe 62 to return to the lower section of the second distillation column 48.

The other part of the base liquid product of the second distillation column 48 leaves the column through a pipe 63 containing a cooler 64 whose cooling fluid is, for example, atmospheric air, followed by a sweetening unit 65, similar to the aforementioned unit 39, to produce gasoline free from mercaptans, discharged through a pipe 66, with the residual non-volatile mercaptans mixed with the sweetening agent being discharged through a pipe 67. At the outlet of the sweetening unit 65, part of the gasoline produced is extracted through a bypass line 68 while the other part is recovered by a pump 69 and, by means of a delivery pipe 70, rejoins delivery pipe 23 of the compressor 24 at a junction 71 to connect at aforementioned pipe 5. In this way, the base liquid product of the second distillation column 48 is mixed with the recompressed gaseous head product of the fractionating column 15 in a specific quantitative proportion, selectively adjusted by the amount of base liquid product extracted through pipe 68. The aforementioned mixture, which in this way forms the two-phase mixed reflux fluid in pipe 5 and which contains C1, C2, C3, C5 hydrocarbons and heavier, and free from mercaptans, contains for example 1% to 3% in moles of gasoline (from pipe 70) per 70% to 99% in moles of volatile compounds (from pipe 23). This mixture, whose preferred composition is in the range of 5 to 20% of gasoline, passes through a cooler 72 whose cooling fluid is, for example, atmospheric air, to make up the fluid returned by reflux through pipe 5 to the absorption column 4, after at least partial condensation in the heat exchanger 2b.

That part of the base liquid product extracted through pipe 68 constitutes the finished product.

The reflux fluid is made up, for example, of the following relative composition, expressed as the molar percentage:

C1 hydrocarbons (methane): 44%
C2 hydrocarbons (ethane): 26%
C3 hydrocarbons (propane): 23%
C5 hydrocarbons (pentane): 5%
C6 hydrocarbons (hexane): 2%

In the present invention, the amount of recirculated solvent, made up of C5 hydrocarbons and heavier, is about twenty times lower than in the aforementioned known process, based on high-pressure absorption in a heavy hydrocarbon. Its role also differs from that of the known process in that the present invention essentially consists in distancing the gas from its critical point in the absorption zone of absorption column 4. This distancing effect is all the more pronounced the heavier the hydrocarbon fraction recycled.

All the aforementioned columns, absorption, fractionating and distillation, are advantageously of the plate column type.

The tables hereinafter give the respective compositions, purely for the purpose of example, of the source gas and processed gas, as well as the numerical results of running gain and revenue calculations in one specific case.

Composition of source gas and processed gas in molar fractions:

| Molar fraction | Source gas | Processed gas |
|---|---|---|
| Water | 0,000001 | 0,000001 |
| Nitrogen | 0,040000 | 0,041171 |
| Carbon dioxide | 0,010000 | 0,010293 |
| Hydrogen sulphide | 0,000010 | 0,000010 |
| Methylmercaptan | 0,000050 | 0,000009 |
| Ethylmercaptan | 0,000170 | 0,000001 |
| Isopropylmercaptan | 0,000050 | 0,000000 |
| N-butylmercaptan | 0,000050 | 0,000000 |
| Methane | 0,852169 | 0,877160 |
| Ethane | 0,050000 | 0,051458 |
| Propane | 0,020000 | 0,017811 |
| Isobutane | 0,007000 | 0,000859 |
| N-butane | 0,009000 | 0,000434 |
| Isopentane | 0,004000 | 0,000445 |
| N-pentane | 0,003000 | 0,000280 |
| N-hexane | 0,002500 | 0,000078 |
| N-heptane | 0,002000 | 0,000000 |

| | | |
|---|---|---|
| Unit cost of compression capacity | | 0.5 French francs/kW.h |
| Unit cost of heating capacity | | 0.05 French francs/kW.h |
| Price difference between liquid and gas | | 0.22 French francs/kg |
| Column head pressure | Abs. bar | 57 |
| Cooling temperature | ° C. | −36 |
| Cooling capacity on 7 | kw | 3647 |
| Cooling temperature on 7 | ° C. | −24 |
| Cooling capacity on 18 | kw | 3156 |
| Cooling temperature on 18 | ° C. | 1, 3 |
| Compression capacity | | |
| Compression capacity on 24 | Kw | 564 |
| Compression capacity on 9 | Kw | 3150 |
| Compression capacity on 7 | Kw | 1798 |
| Compression capacity on 18 | Kw | 930 |
| Total | kw | 6442 |
| Cost of compression | F/h | 3221 |
| Heating capacity | | |
| Capacity of 26 | kw | 7891 |
| Capacity of 43 | Kw | 2782 |
| capacity of 60 | Kw | 3003 |
| Total | Kw | 13676 |
| Cost of heating | F/h | 684 |
| Cost of compression and heating | F:H | 3447 |
| Liquid products | | |
| Propane | Kg/h | 2183 |
| Butane | Kg/h | 17533 |
| C5+ | Kg/h | 17043 |
| Total C3+ C4+ C5+ | Kg/h | 36759 |
| Gain | F/h | 7352 |
| Revenue = gain − cost | F/h | 3447 |

FIG. 2 is a diagrammatic comparison of the running costs of cryogenic processes for elimination of mercaptans from a natural gas according to the invention and according to each of the two aforementioned known processes. This graph shows the difference in gain, given in French francs per hour (F/h), on the ordinate as a function of absolute pressure in the absorption column 4 (FIG. 1), given in bar, on the abscissa.

The graph shows the following three curves:

curve A concerns the simple cryogenic distillation process according to U.S. Pat. No. 3,763,658;

curve B concerns the cryogenic distillation process with C3/C4 recycling according to U.S. Pat. No. 5,659,109;

curve C concerns the process of the invention.

It can be seen that curve C, representing the invention, shows a far greater gain throughout the range of the operating pressures (and especially at high pressure values) than that illustrated by curves B and A* respectively.

The invention is in no way restricted to the means described and represented in FIG. 1 of the appended drawings but rather covers all equivalent variations and modifications of these methods, as well as combinations of these methods, in the framework of the claims which follow.

What is claimed is:

1. A process for purification of a source gas in order to eliminate volatile mercaptan sulfur compounds, comprising cooling and drying a source gas, supplying the source gas to an absorption column under pressure, the absorption column receiving a reflux fluid and producing, as a head product, a purified gas with a mercaptan level of less than 30 parts per million, and a base product supplied to a fractionating column which separates the most volatile compounds of the source gas, free from mercaptans, from a gasoline fraction withdrawn from a base and containing mercaptans, the most volatile mercaptans being eliminated at the head of at least one distillation column producing a base end product consisting of liquid gasoline with a mixture of C5 hydrocarbons and heavier hydrocarbons that, after a sweetening process so as to no longer contain volatile mercaptans, are mixed with the most volatile compounds separated at a top of the fractionating column and recompressed from the source gas, to produce a mixture, cooling the mixture, and sending the mixture by reflux to the absorption column as the reflux fluid.

2. The process according to claim 1 wherein a principal stream of source gas is subdivided into two parallel bypass streams, a first of which is cooled and supplied to a lower section of the absorption column, and a second of which is cooled and supplied to an intermediate zone of the absorption column.

3. The process according to claim 1 wherein the base product of the absorption column, containing C2 hydrocarbons and heavier hydrocarbons and mercaptans, is expanded before being supplied to the fractionating column for separation of mercaptans from the most volatile compounds of the source gas.

4. The process according to claim 3 including expanding and supplying a base product of the fractionating column, containing C3 hydrocarbons and heavier hydrocarbons and mercaptans, to a first gasoline distillation column, functioning as a depropanizer, and producing a base product containing C4 hydrocarbons and heavier hydrocarbons and mercaptans.

5. The process according to claim 1 wherein a base product of a first distillation column contains C4 hydrocarbons and heavier hydrocarbons and mercaptans, including expanding and supplying the base product of the first distillation column to a second gasoline distillation column, functioning as a debutanizer, and producing a base product containing the residual gasoline fraction consisting of C5 hydrocarbons and heavier hydrocarbons and mercaptans.

6. The process according to claim 4 including cooling a head product of said fractionating column, free from mercaptans and containing C1, C2, and C3 hydrocarbons, by partial condensation and separating the base product into a liquid phase sent to said fractionating column and a gaseous phase which is recompressed before being mixed with a distallation end product of the gasoline fraction.

7. The process according to claim 1 including cooling a head product of a first distillation column, containing C3 hydrocarbons and methylmercaptan, by complete condensation and separating the head product of the first distillation column into two partially liquid streams, one of which is sent to a head of the first distillation column and the other of which undergoes a sweetening process to eliminate methylmercaptan to obtain a mixture of C3 hydrocarbons free from mercaptans.

8. The process according to claim 1 including cooling a head product of a second distillation column, containing C4 hydrocarbons and residual volatile mercaptans, by complete condensation and separating the head product of the second distillation column into two partially liquid streams, one of which is sent to a head of the second distillation column and the other of which undergoes a sweetening process to eliminate residual volatile mercaptans to obtain a mixture of C4 hydrocarbons free from mercaptans.

9. The process according to claim 1 including cooling the stream of source gas and the reflux gas with gas emitted at a head of the absorption column and with an auxiliary cooling fluid, such as propane, including reheating the gas emitted from the absorption column by thermal exchange until close to room temperature.

10. An apparatus for the implementation of the process according to claim 1 comprising a compressor, a gasoline distillation column, a fractionating column, and an absorption column to which are successively connected supply pipes for the source and reflux gases, a main supply pipe for the source gas branching into two bypass lines, one of which, along with a reflux pipe, passes through a heat exchanger, and wherein a head of the absorption column is connected to an output pipe for the process gas passing through the heat exchanger, the absorption column having a base connected by a pipe to the fractionating column, a base of the fractionating column being connected by a pipe to the gasoline distillation column which has a base connected by an outlet pipe to a delivery pipe of the compressor connected by pipe to a head of the fractionating column, the outlet pipe and the delivery pipe joining at the reflux pipe.

11. The apparatus according to claim 10 wherein the head of the fractionating column is connected by a pipe passing through a cooler-condenser to an inlet of a phase separator having a gas phase outlet connected to the compressor and having a liquid phase outlet linked to an upper section of the fractionating column.

12. The apparatus according to claim 11 wherein the gasoline distillation comprises first and second gasoline distillation columns connected in series having respective heads each connected through a cooler-condenser to an inlet of a condensate reservoir having an outlet opening into a return pipe at an upper section of a corresponding gasoline distillation column and a header pipe.

13. The apparatus according to claim 12 wherein the header pipe, linked to the first gasoline distillation column, opens at an inlet of a sweetening apparatus having an outlet connected to a C3 hydrocarbon reservoir whilst the header pipe, linked to the second gasoline distillation column opens into a C4 hydrocarbon sweetening system.

14. The apparatus according to claim 10 including a bypass line for C5 hydrocarbons and heavier hydrocarbons connected to an outlet pipe at a base of the second gasoline distillation column.

* * * * *